United States Patent [19]
Krause et al.

[11] Patent Number: 5,623,570
[45] Date of Patent: Apr. 22, 1997

[54] METHOD OF FUSION-SPLICING OPTICAL FIBER

[75] Inventors: John T. Krause, New Providence, N.J.; Dimitrios Stroumbakis, Bayside, N.Y.

[73] Assignee: Lucent Technologies Inc., Murray Hill, N.J.

[21] Appl. No.: 589,314

[22] Filed: Jan. 22, 1996

[51] Int. Cl.$^6$ ........................................ G02B 6/38
[52] U.S. Cl. ........................ 385/95; 385/96; 385/97
[58] Field of Search ............................ 385/95, 96, 97, 385/98, 99, 130

[56] References Cited

U.S. PATENT DOCUMENTS

| | | | |
|---|---|---|---|
| 4,957,343 | 9/1990 | Sato et al. | 385/96 |
| 5,018,824 | 5/1991 | Ooe et al. | 385/96 |
| 5,243,674 | 9/1993 | Chandross et al. | 385/96 |
| 5,360,464 | 11/1994 | Yamauchi et al. | 385/98 X |

OTHER PUBLICATIONS

"Improved Strengths (3.7 GPa) of Arc Fusion Splices for High Yield–High Reliability", by J. T. Krause et al., ECOC '93, 19th European Conference on Optical Communication, Sep. 12–16, 1993, Proceedings, vol. 2.

"Arc Fusion Splices with Improved Strength (4.8 GPa) Approaching the Strength of the Fibre", by A. Berg et al., *Electronics Letters*, vol. 31, No. 4, 16th Feb. 1995, pp. 308–309.

*Primary Examiner*—Phan T. H. Palmer
*Attorney, Agent, or Firm*—Eugen E. Pacher

[57] ABSTRACT

The disclosed method of fusion splicing silica-based optical fiber comprises removing of the polymer coating from the end portions of the respective fibers by contacting the end portions with a chemical polymer remover (e.q., hot sulfuric acid with 5% nitric acid) such that a film of material that comprises the remover remains on the stripped fiber. Typically this is accomplished by refraining from the conventional rinsing of the stripped fiber portions. The film-covered stripped fibers are then fusion spliced in conventional fashion. Splices of strength close to the strength of as-drawn fiber were obtained by this method.

9 Claims, 2 Drawing Sheets

METHOD OF FUSION-SPLICING OPTICAL FIBER

FIELD OF THE INVENTION

This invention pertains to methods of fusion splicing silica-based optical fiber.

BACKGROUND OF THE INVENTION

The need of butt-splicing together two lengths of optical fiber is widespread in various applications of optical fibers, e.g., in optical fiber communication systems. A variety of techniques for accomplishing such splicing have been developed. Among them are flame fusion splicing, laser fusion splicing, and arc fusion splicing. Especially the latter process has been substantially automated, and arc fusion splicers are commercially available.

Although splicing of silica-based optical fiber is now largely routine, there remains at least one shortcoming. In particular, the tensile strength of the splice is typically substantially less than the tensile strength of the as-drawn, polymer-coated fiber, the "pristine" strength of the fiber. Those skilled in the art will readily appreciate that in certain industrial applications of optical fibers (e.g., submarine optical fiber communication systems, sensors in oil well installations, smart skin structures) the need for high strength splices is urgent.

Substantial progress in the field of high strength splices has already been made. See, for instance, J. T. Krause et al., ECOC '93, Proceedings, Vol. 2, p. 449, (1993). However, there typically is still a considerable difference in average tensile strength between a batch of fibers spliced according to the prior art and a corresponding batch of pristine fiber. This application discloses a splicing technique that can yield fusion splices with average strength close to the average pristine strength.

THE INVENTION

Optical fibers typically carry a polymer coating. Before splicing together two fibers, the polymer coating is removed from the ends of the two fibers. This is typically accomplished by means of hot sulfuric acid, optionally with some added nitric acid or other oxidizer. See U.S. Pat. No. 5,243,674. According to the prior art, the bare fiber ends are rinsed (e.g., in de-ionized water) prior to fusion splicing.

We have made the surprising discovery that splices of near pristine strength can result if the above rinse is eliminated. More generally, the fusion splicing method according to the invention comprises the steps of contacting the fiber ends with a chemical coating-remover such that the polymer coating is removed from the fiber ends, and such that a thin film comprising said chemical coating-remover remains on the coating-free fiber ends. The method further comprises cleaving the fiber ends, heating the fiber ends with the thin films thereon, and fusing the heated cleaved fiber ends. Fusion will typically be arc fusion, but could be flame fusion.

The exact mechanism by which elimination of the rinse after removal of the polymer coating from the fiber can result in higher-strength fusion splices is not yet known. However, it is likely that the thin film of chemical coating remover acts as a barrier against moisture, against contact with airborne particles during the period of fusion, and/or against contact with particles from the electrodes of an arc fusion splicer.

The need to avoid deposition of particles on the bare fiber (and fusion of the particles into the fiber surface) has been recognized, and techniques for reducing such deposition are known. We contemplate that at least some, if not all of these prior art techniques will be incorporated into the method according to this invention.

In an exemplary embodiment of the instant invention, a batch of 20–30 splices was prepared and tested as follows. For each given splice, two pieces of conventional silica-based optical fiber were spliced by means of a conventional arc fusion splicer. The polymer coating was removed from about 4 cm of each fiber by dipping for about 30 sec. into hot (180° C.) sulfuric acid with 5% nitric acid. After withdrawal of the fibers from the hot acid, the fibers were cleaved in conventional fashion, mounted in an arc fusion splicer, and fusion spliced, all while care was taken to avoid contact with the bare fiber, and while conventional precautions against deposition of particulates on the bare fiber were taken. After conventional re-coating of the fiber in the splice region, the tensile strength of each given splice was measured in conventional fashion.

Figure 1:
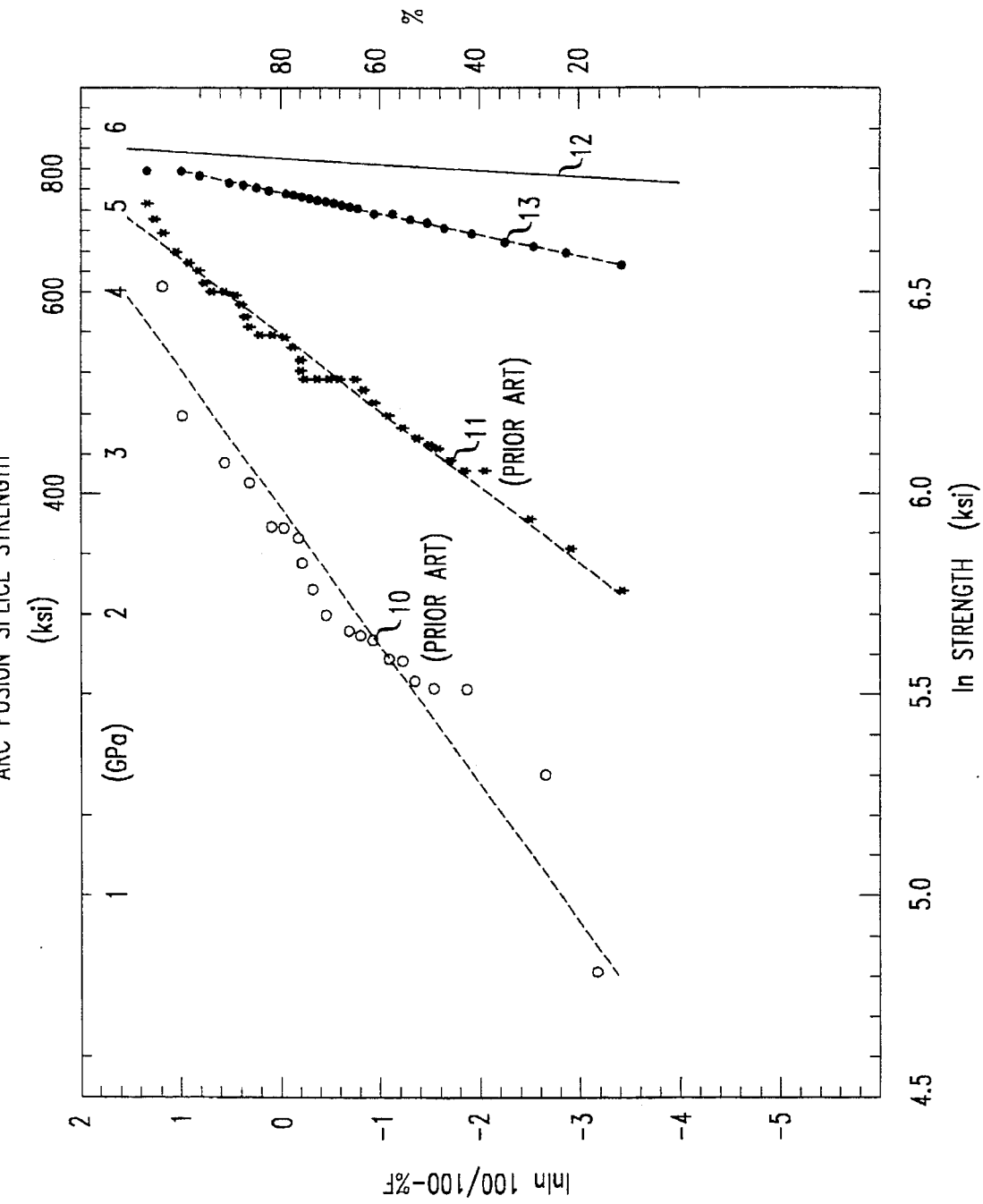
FIG. 1 presents exemplary data on arc fusion splice strength obtained by two prior art techniques, as well as obtained by an embodiment of the inventive technique. The figure also shows exemplary data on the strength of as drawn (pristine) fiber.

The results of the measurements are presented in form of a Weibull plot in FIG. 1, wherein curves 10–13 refer, respectively, to typical prior art arc fusion results, to improved prior art results reported by J. T. Krause et al., op. cit., to strengths measured on splices produced according to the invention, and to the nominally pristine strength of fused silica, as observed in as-drawn fiber. The splices according to the invention had median tensile strength of 758 ksi (5.2 GPa), with coefficient of variation v=0.05 and unspliced fiber has nominal strength of 800 ksi (5.5 GPa), with v<0.01. Clearly, splices according to the invention can have strength very close to the pristine strength of fused silica.

A. Berg et al., *Electronics Letters*, Vol. 31 (4), p. 308 (1995), reported arc fusion splices having relatively high median strength (4.8 GPa). However, the reported strength distribution was markedly bimodal, having significantly lower slope in the lower 20% of the distribution. Such a bimodal distribution is undesirable because it indicates more than one mechanism affecting strength, at least one of which is not being controlled. In comparison, the distribution of curve 12 of FIG. 1 is essentially unimodal, a distribution that, being relatively narrow, has values that are close to that of the median, which in turn is nearly equal to that of the original fiber.

Figure 2:
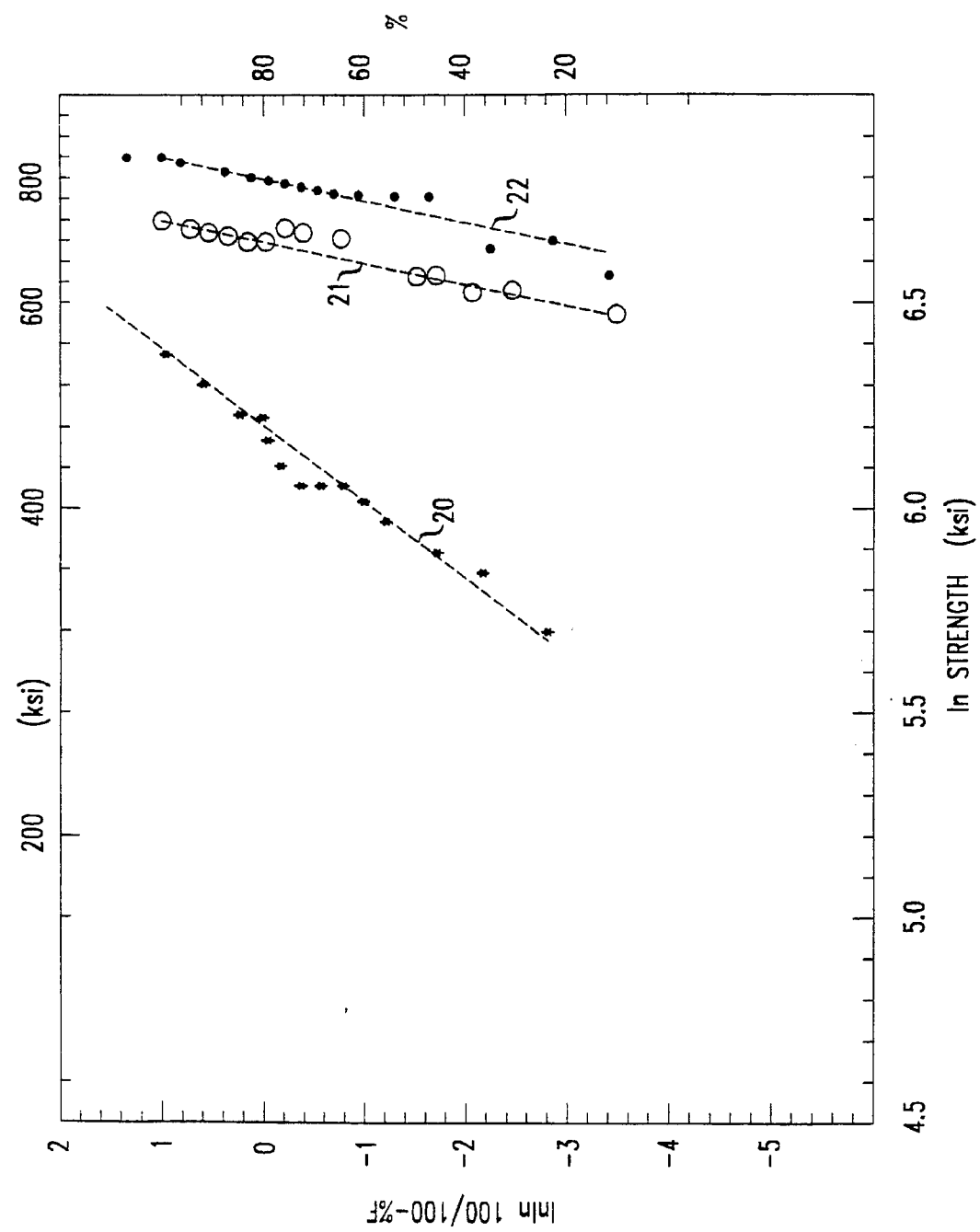
FIG. 2 shows exemplary data on arc fusion splice strength as a function of arc frequency.

We have also made the unexpected discovery that the strength of arc fusion splices typically increases with the frequency of the arc discharge. This is exemplified by the Weibull plot of FIG. 2, wherein curves 20–22 refer, respectively, to discharge frequency of 120 Hz, 14 kHz, and 110 kHz. All process parameters other than discharge frequency were maintained constant. The dependence of splice strength on arc frequency is evident from the exemplary data of FIG. 2. In view of our discovery, arc fusion equipment will desirably provide a relatively high frequency arc, typically 10 kHz or above, preferably 100 kHz or above.

The invention claimed is:

1. Method of making an article that comprises a first length of polymer-coated silica-based optical fiber that is fusion spliced to second length of polymer-coated silica-based optical fiber, the method comprising
   a) providing the first and second lengths of polymer-coated fibers;
   b) contacting an end portion of each of said first and second lengths of polymer-coated fibers with a chemical polymer remover such that the polymer coating is removed from a portion of each of said first and second lengths of fiber, said portions to be referred to as the "stripped" portions; and
   c) heating the stripped portions and butt-splicing the stripped portions;
   characterized in that
   d) step b) is carried out such that the stripped portions are covered during at least a major portion of the time from removal of the polymer to at least the beginning of step c), with a film of material that comprises said chemical polymer remover.

2. Method of claim 1, wherein the method comprises carrying out step c) on stripped portions that were not rinsed subsequent to removal of the polymer coating.

3. Method of claim 2, wherein the chemical polymer remover comprises sulfuric acid.

4. Method of claim 3, wherein the chemical polymer remover further comprises nitric acid.

5. Method of claim 1, wherein step c) is carried out in an arc fusion splicer.

6. Method of claim 5, wherein said arc fusion splicer is selected to have an arc frequency of at least 10 kHz.

7. Method of claim 6, wherein said arc frequency is at least 100 kHz.

8. Method of claim 1, wherein step c) is carried out in a flame fusion splicer.

9. Method of claim 1, further comprising cleaving, prior to heating the stripped portions, at least one of said stripped portions.

* * * * *